(12) United States Patent
Narayanan

(10) Patent No.: US 9,210,573 B2
(45) Date of Patent: Dec. 8, 2015

(54) METHOD AND APPARATUS FOR REGISTERING A COMPUTING DEVICE WITH A SERVICE PROVIDER

(75) Inventor: Anoop Narayanan, Kottayam (IN)

(73) Assignee: Infosys Limited, Bangalore (IN)

(*) Notice: Subject to any disclaimer, the term of this patent is extended or adjusted under 35 U.S.C. 154(b) by 610 days.

(21) Appl. No.: 13/418,321

(22) Filed: Mar. 12, 2012

(65) Prior Publication Data

US 2013/0165117 A1      Jun. 27, 2013

(30) Foreign Application Priority Data

Dec. 27, 2011  (IN) ............................ 4607/CHE/2011
Dec. 27, 2011  (IN) ............................ 4608/CHE/2011

(51) Int. Cl.
*H04W 60/00* (2009.01)
*H04W 12/06* (2009.01)
*H04W 60/04* (2009.01)
*H04W 8/20* (2009.01)

(52) U.S. Cl.
CPC .............. *H04W 12/06* (2013.01); *H04W 60/04* (2013.01); *H04W 8/20* (2013.01)

(58) Field of Classification Search
CPC ........... H04W 60/00; H04Q 7/38; H04L 9/00; H04M 2250/66
USPC ...................... 455/414.1, 435.1, 445; 713/193
See application file for complete search history.

(56) References Cited

U.S. PATENT DOCUMENTS

| | | | |
|---|---|---|---|
| 7,757,945 B2 | 7/2010 | Gray et al. | |
| 7,913,914 B2 | 3/2011 | Nilsson | |
| 2007/0099599 A1* | 5/2007 | Smith et al. | ................ 455/414.1 |
| 2009/0005016 A1* | 1/2009 | Eng et al. | ................... 455/414.1 |
| 2009/0167699 A1 | 7/2009 | Rosenblatt et al. | |
| 2009/0177581 A1 | 7/2009 | Garcia et al. | |
| 2010/0078471 A1 | 4/2010 | Lin et al. | |
| 2010/0082444 A1 | 4/2010 | Lin et al. | |
| 2010/0082445 A1 | 4/2010 | Hodge et al. | |
| 2010/0082455 A1 | 4/2010 | Rosenblatt et al. | |
| 2010/0082481 A1 | 4/2010 | Lin et al. | |

(Continued)

FOREIGN PATENT DOCUMENTS

| | | |
|---|---|---|
| CN | 2802593 | 8/2006 |
| GB | 2412544 | 9/2005 |

(Continued)

OTHER PUBLICATIONS www.nfcworld.com/2010/04/08/33341/apple-to-build-mobile-payments-business-around-itunes-credits/.

(Continued)

*Primary Examiner* — Myron K Wyche
(74) *Attorney, Agent, or Firm* — Marc S. Kaufman; Mark T. Vogelbacker; Reed Smith LLP

(57) ABSTRACT

A method and apparatus for providing authentication of a computing device with a communications service. A subscriber identity module image is transmitted to the device and stored in a general memory of the device and soft SIM data. A secure module on the device permits access to the soft SIM data. The Soft SIM data is registered with the service provider in association with a unique identification of the device. The soft SIM data has a one to one relationship with the device. A device can have many instances of soft SIM data.

28 Claims, 4 Drawing Sheets

(56) References Cited

U.S. PATENT DOCUMENTS

| | | | |
|---|---|---|---|
| 2010/0082485 A1 | 4/2010 | Lin et al. | |
| 2010/0161433 A1 | 6/2010 | White | |
| 2011/0081951 A1* | 4/2011 | Hwang | 455/558 |
| 2011/0161188 A1 | 6/2011 | Roberts | |
| 2011/0281589 A1* | 11/2011 | De Beer | 455/445 |
| 2013/0007470 A1* | 1/2013 | Violleau et al. | 713/193 |

FOREIGN PATENT DOCUMENTS

| | | |
|---|---|---|
| GB | 2466038 | 6/2010 |
| KR | 2004066769 | 7/2004 |
| KR | 100846161 | 4/2008 |
| KR | 2010074341 | 7/2010 |
| WO | 2008089383 | 7/2008 |
| WO | 2011063303 | 5/2011 |

OTHER PUBLICATIONS www.nfcworld.conn/2010/04/14/33380/ipay-ibuy-and-icoupons-latest-patents-show-apple-has-a-clear-business-model-for-nfc-enabled-mobile-payments-and-promotions/.
www.youtube.com/watch?v=V3pE1QD8UZg&feature=related.
www.dekart.com/products/card_management/sim_manager.
www.ameinfo.com/63590.html.
www.silicon.com/technology/mobile/2004/10/13/motorola-and-mastercard-in-credit-card-phone-trial-39124936/.
www.sybase.com/mobileservices/financial-services.
Author: Mahil Carr, Title: Mobile Payment Systems and Services: An Introduction.
Author: Marcus Persson, Title: Mobile Banking and Payments.
Author(s): Eidorif, P.H. Henglein, F. Mossin, C. Niss, H. Sorenson, M.H. Tofte, Title: "Anno Domini: from type theory to Year 2000 conversion tool".

* cited by examiner

METHOD AND APPARATUS FOR REGISTERING A COMPUTING DEVICE WITH A SERVICE PROVIDER

RELATED APPLICATION DATA

This application claims priority to Indian Patent Application No. 4607/CHE/2011, filed Dec. 27, 2011, and Indian Patent Application No. 4608/CHE/2011, filed Dec. 27, 2011, both of which are hereby incorporated by reference in its entirety.

BACKGROUND

A "SIM" card (Subscriber Identity Module) is a well known mechanism for identifying and authenticating devices, such as mobile phones and other mobile computing devices. A (SIM) is a removable integrated circuit which can be transferred between different mobile devices. SIM cards have been made in various physical formats. A SIM card ordinarily contains its unique serial number, known as an integrated circuit card identifier (ICCID), a unique identifier of the mobile user, known as the International Mobile Subscriber Identity (IMSI), security authentication and ciphering information, temporary information related to the local network, a list of the services the user has access to and two passwords (PIN for usual use and PUK for PIN unlocking). The SIM card is associated with a mobile phone number in a service provider database to tie the user to the communications service, such as voice, messaging, and data service.

A "virtual SIM" is a mobile phone number provided by a mobile network operator that does not require a SIM card to connect phone calls to a user's mobile phone. USIM (Universal Subscriber Identity Module) is an application for a Universal Mobile Telecommunications System (UMTS) mobile telephony application running on a Universal Integrated Circuit Card (UICC) smart card which is inserted in a 3G mobile phone. There is a common misconception to call the UICC itself a USIM, but the USIM is merely a logical entity on the physical card. It stores user subscriber information, authentication information and provides storage space for text messages and phone book contacts. The equivalent of USIM on CDMA networks is CSIM.

The International Mobile Equipment Identity (IMEI) is a number used to identify the hardware device, as opposed to a phone number assigned to the device. The IMEI is only used for identifying the device and has no permanent or semi-permanent relation to the subscriber. Instead, the subscriber is identified by the IMSI number, which is stored on the SIM card that can be transferred to any handset.

Typically, a mobile communications service provider, provides a SIM card to a customer and the customer inserts the SIM card into their mobile device. Each SIM card is associated with a single unique mobile phone number. When a service provider is selling services on a long-term contract, the mobile phone number is tied to the SIM card for the duration of the contract.

In all cases, known SIM cards, and similar authentication mechanisms tie the user to a service provider. In order to obtain a SIM card, the customer must visit the service provider or otherwise arrange for physical delivery of the SIM. If the SIM card is damaged or lost, a new one must be physically delivered. The small size of a SIM card makes handling thereof difficult and limits the amount of data that can be stored thereon. Further, SIM cards are relatively expensive to manufacture. Notwithstanding the small size of SIM cards, the SIM card and related hardware take up a substantial amount of space in small mobile devices.

While systems and methods are described herein by way of example and embodiments, those skilled in the art recognize that systems and methods for managing underground assets are not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The inventor has discovered that, while known SIMs provide reasonable security, they tie the user to a specific service provider. A more flexible mechanism for providing authentication could increase user options and create new flexible models for providing wireless communications services.

If a customer desires to have more than one mobile phone number, the customer must have plural devices or have plural SIM cards supported by a single device. GSM services only authenticate the user to the network, and not the network to the user. The known security model offers confidentiality and authentication to the network, but limited authorization capabilities, and no non-repudiation. Therefore, if the plastic SIM card is replicated, the user is able to use it in the network and the very purpose of using a dedicated physical card and associated hardware for reading the card does provide adequate security.

SIM card technology has not been successful in tightly coupling the association between SIM modules, service providers and the customers. Also SIM cards place limitations on service providers for extending services to existing customers. The current business model relies on growth in revenue mainly by creating new customers.

The disclosed embodiments, referred to as "soft SIMs", provide a read-only encrypted image of a physical SIM card and a secure module, such as a system level driver or a virtual machine, on the mobile device for reading the image. Accordingly, one or more soft SIMs can be delivered to a device in place of the physical SIM card. The service provider can thus update the SIM data over a GPRS or other wireless connection. The SIM data is associated with a unique device identifier, such as an IMEI number, in a database of the service provider. The data of the soft SIM can be used to perform various operations in the device and to tie the device to various service providers.

Figure 1:
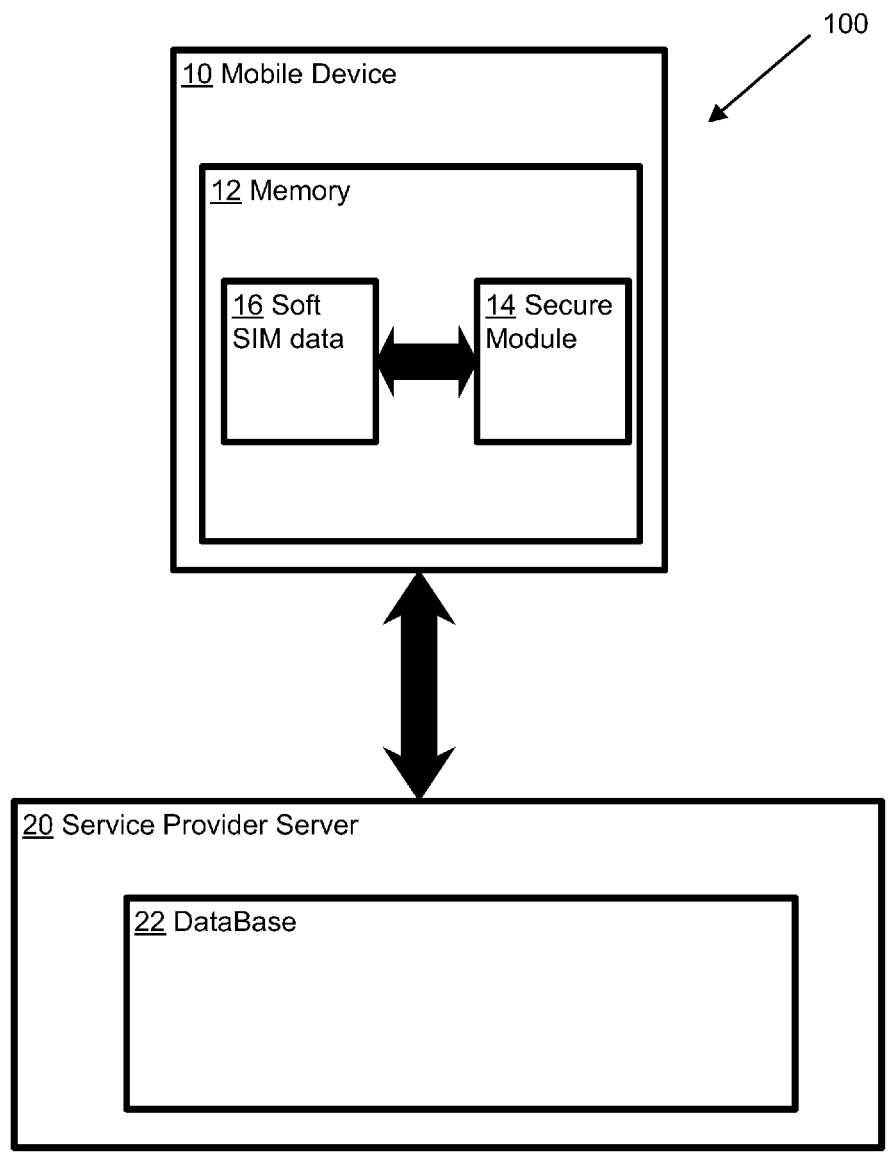
FIG. 1 is a block diagram of a system of a disclosed embodiment for registering a computing device with a service provider.

FIG. 1 illustrates a system 100 employing a soft SIM for authenticating a mobile device with a service provider. System 100 includes one or more mobile devices 10, such as mobile smartphones, and service provider server 20, such as a computer system of a wireless communications provider. A user of mobile device 10 enters an agreement with the service provider to provide wireless communication services, such as voice, data, texting, web, and the like, through service provider server 20. Soft SIM data 16 is stored in memory 12, such as the main memory of a smartphone. Secure module 14 is also stored in memory 12 to provide security for soft SIM data 16. For example, secure module 14 can be code to define a secure system level driver for securely reading soft SIM data 16 or a code to define a virtual machine for isolating soft SIM data 16. Database 22 stores records that associate soft SIM data 16 with mobile device, as described in greater detail below. Soft SIM data 16 can be transmitted to mobile device 10 as an image of a SIM card.

Figure 2:
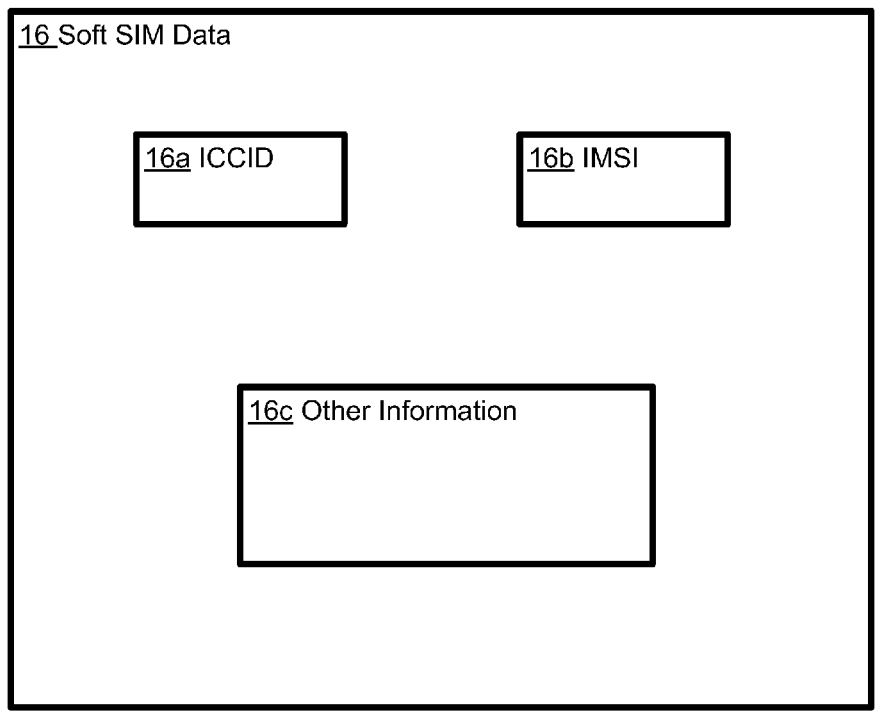
FIG. 2 is a block diagram of a data structure of an example of the soft SIM data.

FIG. 2 illustrates an example of data structure of soft SIM data 16, which includes a unique serial number, such as ICCID 16a, and a unique identifier of the mobile user, such as IMSI 16b. Soft SIM data 16 can also include security authentication and ciphering information, temporary information related to the local network, a list of the services and passwords/PINS.

Figure 3:
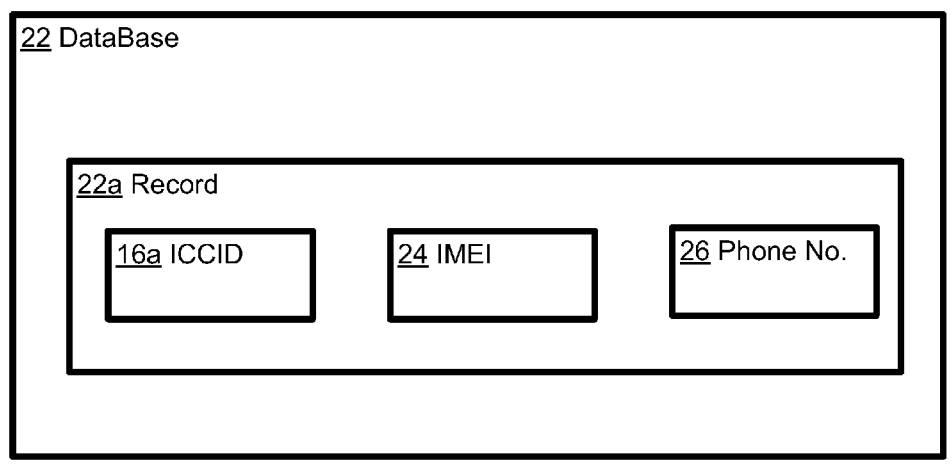
FIG. 3 is a block diagram of an example of a database record for associating the soft SIM with a device.

As illustrated in FIG. 3, soft SIM data 16 is associated with device 10 of FIG. 1, through database 22. Record 22a of database 22 includes the unique serial number of soft SIM data 16, such as ICCID 16a and an identifier of mobile device 10 on which soft SIM data 16 is stored, such as an IMEI number 24 of mobile device 10. Record 22a can also store a phone number. Of course, database 22 can have multiple records 22a, one or more for each mobile device 10, or other device, that is registered with the service provider. For example, there can be two sets of soft SIM data 16 in mobile device 10 and a record 22a for each of the two sets of soft SIM data 16. Further, the two records 22a can be stored in the databases of two different service providers.

The system described above provides many advantages over conventional SIMs which associates a user with a service in a one to one relationship. For example, a user may subscribe a single device to services across different countries by different providers, without the need for roaming. The service provider(s) can configure the soft SIM data to make it operate in a particular area for a specified period of time for a customized charge. The service provider may extend the roaming free service across different countries by converting the soft SIM data in to soft SIM data of a local service provider of that country. This reduces the chance of the customer contracting separately with a local service provider in order to avoid roaming charges and will create a revenue model which will improve customer loyalty.

The soft SIM may have unlimited (theoretically) storage space for saving contacts and messages, since the soft SIM can directly map to the physical memory of the device or to remote "cloud" memory services. The soft SIM cannot be copied and used in another mobile device without registering with the service provider, since the service provider ensures that the call is made from the registered device identifier, such as the IMEI number.

A single mobile device can store multiple instances of soft SIM data. This permits making/receiving calls through multiple cell phone numbers on a single device. For example, a user may have a work number and a personal number. Users can lock/unlock, disable/enable, or repair the soft SIM image by connecting the mobile device over internet to the service provider, through a website for example. A user will be prevented from deleting of modifying SIM image in a device, however.

A service provider can automate the process of providing services for a new customer over the company website and the customer only need to connect the device to service provider server. A soft SIM will be installed to the device automatically by downloading the SIM image. Identification of device type and suitable soft SIM driver will be handled by the service provider server. Identification, IMEI, and other information may be submitted online. If the mobile device is lost, the user can download a new soft SIM image to a new mobile device, from the service provider through an online transaction and register the IMEI number online with the service provider after authentication. A subscribing user can share contact information and stored in the soft SIM with any other person using the services offered by the service provider.

Any device can be configured to support a soft SIM, with only software level modifications. No additional hardware support is required. The soft SIM driver will be capable of using the antennae of the device to connect to the wireless network. Since the soft SIM is locked with the IMEI number, and not the physical device, it is very secure and authentic and difficult to hack.

Each different service provider can use an encryption algorithm having a common component and a confidential component. Accordingly, a system can be developed whereby any service provider will be able to read certain mandatory information from any soft SIM data, but a service provider will be able to clear only soft SIM data which have been issued by them. This helps service providers to track the customer even if the customer switches to the services of a new service provider without properly terminating the business contracts with the first service provider.

Preferably, each soft SIM image can be registered with one and only one IMEI number at a point of time. Therefore the same soft SIM cannot be used in two different devices simultaneously. Of course, as noted above, multiple sets, i.e. instances, of soft SIM data can be stored in a single device. The relationship between devices and soft SIM data sets can be one to many while the relationships a specific soft SIM data set to devices is one to one.

The IMEI number can be associated with a user's financial information such as bank account information to allow the soft SIM data to be used in the role of a digital signature of a person. The use of soft SIM data eliminates the use of plastic and copper for manufacturing SIM cards.

To distribute the soft SIM data, a service provider can transmit an image of a SIM card to the device to serve as the soft SIM data. The SIM image should be a read only, encrypted copy of a physical SIM card. The secure module is an application or operating system level driver in the device for reading the soft SIM data. The user can register the IMEI number of the mobile device with the service provider through a web interface or the like. The secure module can be delivered to the device in any manner.

Similar to Credit cards, were a bank will offer the customer different add on services for the same credit card, the telecom service provider can extend services to customers using different add on sets of soft SIM data, each for a specific purposes. Some use cases are: cell numbers to establish a social network among selected friends, a dedicated cell number for making international calls, for SMS notifications or voice messages from any automated systems, a dedicated cell number for official contacts, for online transactions, for receiving advertisements and promotional offers, for monitoring financial transaction details and mobile banking, or for any special dedicated use. Different fees, tariffs or other parameters can be associated with each set of soft SIM data.

Figure 4:
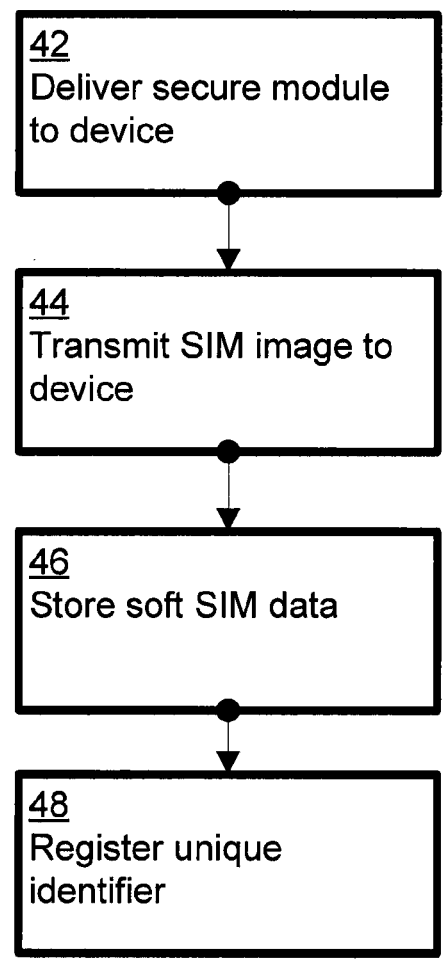
FIG. 4 is a flow chart of a method of registering a device with a service provider in accordance with an embodiment.

FIG. 4 illustrates a method for registering a device with a service provider. In step 42, a secure module is delivered to the device. The secure module is any type of software code that allows secure reading of soft SIM data. For example, the secure module can be a system level driver for reading soft SIM data or code to establish a virtual machine for processing the soft SIM data. Delivery can be accomplished in any manner at any time. For example, the secure module can be delivered over a wireless network to the device directly or indirectly from the service provider or the secure module can be provided by the device manufacturer or a third party.

In step 44, a SIM image is transmitted to the device. The SIM image can be a copy of data stored on a physical SIM card or can be the data described above created in any manner. In step 46, the SIM image is stored in memory of the device as soft SIM data. IN step 48, a unique identifier of the device, such as an IMEI, is registered in association with the soft SIM data. Communications services can then be provided base on the unique identifier.

The unique device identifier can be an IMEI number or any other identifier that is stored in the device in a manner that does not readily permit the user to modify it. For example, a value stored in ROM of the device or any specific memory area within the processor/motherboard can be used as long as users do not have access to this memory for editing data. Only the OEM and the telecom service provider should have write access to this memory. An OEM can provide the key or decryption mechanism to the telecom service provider in order to provide write access to this restricted memory area. Depending up on the security regulations, this memory can be made read only for telecom service providers also.

The disclosed embodiments facilitate new business models and a variety of new service offerings not yet known in the market. The new technologies provided herein can coexist with the existing SIM technology to allow faster and deeper penetration in the telecommunication market. The embodiments could bring drastic changes to the telecom industry. GSM players could extend their services to users having CDMA devices. A mobile device user can have multiple cell phone numbers for a single cell phone allowing him/her to use each number for specific needs like official/personal/family/overseas calls. Further, the disclosed embodiments permit one type of service to be provided over GSM and another type of service to be provided over CDMA, on the same device. This could permit a disadvantage of CDMA, that voice and data cannot be transmitted at the same time, to be overcome.

It is apparent that the disclosed embodiments can be used to facilitate provisioning and providing various services.

The disclosed embodiments can be applied to any type of computing device and any type of communications service. Devices can include personal computers, mobile phones, PDAs, tablet devices, and the like. The term "device" as used herein can be construed to include one ore more devices operating in concert with one another.

Embodiments have been disclosed herein. However, various modifications can be made without departing from the scope of the embodiments as defined by the appended claims and legal equivalents.

The invention claimed is:

1. A method for registering a computing device with one or more communications service providers in order to securely provide communications service to a user of the computing device, the method comprising:

transmitting a SIM card image from the one or more communications service providers to the computing device, the SIM card image being a read-only encrypted image of a physical SIM card and including soft SIM data, the soft SIM data including a unique serial number and a unique identifier of the user of the computing device, the computing device having a secure module that is configured to read the soft SIM data in a secure manner;

storing the SIM card image in internal memory of the computing device as the soft SIM data; and registering a unique identifier of the computing device in association with the soft SIM data for the purpose of providing communications service to the device.

2. The method of claim 1, wherein the unique identifier is a value stored in a secure memory of the computing device and wherein the user does not have write access to the secure memory.

3. The method of claim 2, wherein the unique identifier is an IMEI number.

4. The method of claim 3, further comprising linking the IMEI number with at least one phone number associated with the computing device.

5. The method of claim 1, wherein the transmitting step is accomplished over a wireless network interface.

6. The method of claim 1, wherein the soft SIM data is directly mapped to at least one of physical memory of the device and remote memory services.

7. The method of claim 3, wherein said registering step comprises permitting registering of a only one IMEI number with an instance of the soft SIM data at any point in time.

8. The method of claim 1, wherein said transmitting step comprises transmitting at least two SIM card images to the computing device, said storing step comprises storing the at least two SIM card images as at least two corresponding instances of the soft SIM data, and wherein said registering step comprises registering a unique identifier of the computing device in association each of the at least two instances of the soft SIM data.

9. The method of claim 1, wherein the secure module is code to provide a system level driver for reading the soft SIM data.

10. The method of claim 1, wherein the secure module is code to provide a virtual machine for processing the soft SIM data.

11. The method of claim 1, further comprising provisioning at least one communications service to the device based on the registering step.

12. The method of claim 11, wherein said provisioning step comprises provisioning at least two different types of communications services to the device, wherein one of the two different types of communications services is GSM and another of the two different types of communications services is CDMA.

13. Non-transitory computer readable media having instructions recorded thereon which, when executed by a computer processor, cause the processor to carry out a method for registering a computing device with one or more communications service providers in order to securely provide communications service to a user of the computing device, the method comprising:

transmitting a SIM card image from the one or more communications service providers to the computing device, the SIM card image being a read-only encrypted image of a physical SIM card and including soft SIM data, the soft SIM data including a unique serial number and a unique identifier of the user of the computing device, the computing device having a secure module that is configured to read the soft SIM data in a secure manner;

storing the SIM card image in internal memory of the computing device as the soft SIM data; and registering a unique identifier of the computing device in association with the soft SIM data for the purpose of providing communications service to the device.

14. The media of claim 13, wherein the unique identifier is a value stored in a secure memory of the computing device and wherein the user does not have write access to the secure memory.

15. The media of claim 14, wherein the unique identifier is an IMEI number.

16. The media of claim 15, further comprising linking the IMEI number with at least one phone number associated with the computing device.

17. The media of claim 13, wherein the transmitting step is accomplished over a wireless network interface.

18. The media of claim 13, wherein the soft SIM data is directly mapped to at least one of physical memory of the device and remote memory services.

19. The media of claim 15, wherein said registering step comprises permitting registering of a only one IMEI number with an instance of the soft SIM data at any point in time.

20. The media of claim 13, wherein said transmitting step comprises transmitting at least two SIM card images to the computing device, said storing step comprises storing the at least two SIM card images as at least two corresponding instances of the soft SIM data, and wherein said registering step comprises registering a unique identifier of the computing device in association each of the at least two instances of the soft SIM data.

21. The media of claim 13, wherein the secure module is code to provide a system level driver for reading the soft SIM data.

22. The media of claim 13, wherein the secure module is code to provide a virtual machine for processing the soft SIM data.

23. The media of claim 13, further comprising provisioning at least one communications service to the device based on the registering step.

24. The media of claim 23, wherein said provisioning step comprises provisioning at least two different types of communications services to the device, wherein one of the two different types of communications services is GSM and another of the two different types of communications services is CDMA.

25. The method of claim 1, further comprising:

configuring the soft SIM data so as to operate in only a particular geographic area for only a specific period of time.

26. The method of claim 1, wherein the computing device is configured to make or receive calls through two or more different cell phone numbers, and wherein the mobile device does not include a physical SIM card.

27. The method of claim 1, wherein the unique serial number is an integrated circuit card identifier (ICCID), the unique identifier of the user of the computing device is an International Mobile Subscriber Identity (IMSI), and the unique identifier of the computing device is an International Mobile Equipment Identity (IMEI).

28. The method of claim 1, wherein the computing device is a single mobile telephone configured to store multiple instances of the soft SIM data such that the telephone is capable of making and receiving call through multiple cell phone numbers.

* * * * *